(12) United States Patent
Rodrigues et al.

(10) Patent No.: US 6,944,388 B2
(45) Date of Patent: Sep. 13, 2005

(54) SPLICE PROTECTION SLEEVE

(75) Inventors: Alberto Rodrigues, Herblay (FR); Thorsten Muller, Menden (FR); Jean-Louis Delatouche, Chateauneuf en Thymerais (FR); Yannick Schreiber, Chartres (FR)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/482,075

(22) PCT Filed: Jun. 20, 2002

(86) PCT No.: PCT/EP02/06832
§ 371 (c)(1),
(2), (4) Date: May 24, 2004

(87) PCT Pub. No.: WO03/003533
PCT Pub. Date: Jan. 9, 2003

(65) Prior Publication Data
US 2004/0208467 A1 Oct. 21, 2004

(30) Foreign Application Priority Data
Jun. 29, 2001 (FR) .......................................... 01 08602
Jun. 29, 2001 (FR) .......................................... 01 08597

(51) Int. Cl.$^7$ .................................................. G02B 6/00
(52) U.S. Cl. ........................ 385/135; 385/136; 385/137
(58) Field of Search ................................ 385/134–137, 385/95, 139, 138; 174/93, 92

(56) References Cited

U.S. PATENT DOCUMENTS 6,856,747 B2 * 2/2005 Cloud et al. ................. 385/135

* cited by examiner

Primary Examiner—Frank G. Font
Assistant Examiner—Michael P. Mooney

(57) ABSTRACT

A splice protection sleeve includes two half-shells provided with means for assembling them into a shell and at least two end flanges, each of them consisting of sub-flanges assembled by assembling means so as to form an opening for the passage of a cable, the assembling means including two dovetail bars and a wedge joining the two bars together.

Furthermore, in a splice protection sleeve according to the invention, the half-shell includes, on the inner face, a cam which extends in the circumferential direction and is followed in this direction by a housing and the flange includes a stub intended to push the cam back before entering the housing.

10 Claims, 11 Drawing Sheets

SPLICE PROTECTION SLEEVE

CROSS REFERENCE TO RELATED APPLICATIONS

This application is a United States national application claiming priority to International Application No. PCT/EP02/06832, filed on Jun. 20, 2002, which claims priority to French Patent Application No. 0108597, filed on Jun. 29, 2001 and French Patent Application No. 0108602, filed Jun. 29, 2001.

1. Field of the Invention

The present invention relates to splice protection sleeves used especially in the telecommunications field for the purpose of protecting a cable, especially a power cable or a telephone cable such as a fibre-optic cable. Furthermore, the present invention relates to splice protection sleeves used especially to protect the splices of power or telecommunications cables, such as a fibre-optic cable.

2. Background of the Invention

Already known is a splice protection sleeve which may comprise two half-shells provided with means for assembling them into a shell or a split shell or a bell-shaped shell. The sleeve has at least one end flange, each flange consisting of at least two sub-flanges together defining a semicircular opening. There may for example be two half-flanges or three sub-flanges. The sub-flanges are assembled by removable assembling means, namely by screws for firmly clamping the cable.

This assembling by screws has many drawbacks on site. Often seizures may occur or a nut may be missing. Before mounting, measures must be taken to ensure that the screws cannot be lost. They must therefore be placed in a bag to be supplied at the same time as the rest of the plastic parts for constructing the sleeve. This complicates the packaging and the delivery of parts intended to allow the sleeve to be constructed on site. The screws may furthermore be easily lost. They are relatively small in size and, at the place where they are mounted, considerable forces are applied to the plastic parts, forces which cause the plastic to undergo premature ageing.

The invention remedies these drawbacks by a splice protection sleeve which can consist only of plastic parts and can be mounted and removed very quickly.

The splice protection sleeve of the abovementioned type is characterized in that the assembling means include two dovetail bars and a wedge joining the two bars together, the sub-flanges have a tapped portion, and a deformable ring having at least one elastic part is interposed between the tapped portion and an at least partly frustoconical two-part threaded annulus. The annulus, whose inside diameter of the small transverse surface is smaller than the outside diameter of the undeformed ring, being screwed into the tapped portion of the opening, by being inserted thereinto via its transverse surface of large inside diameter.

Thus, the screws are entirely replaced with a wedging arrangement obtained with the aid of plastic parts.

According to one embodiment, the two bars stem from the two facing-edge generatrices of two half-flanges. This particularly simple embodiment is especially suitable when the flange has only one opening or only two openings for the passage of cables. But when there are more openings, and especially four openings, it is preferred that the two assembling bars be provided on the inner face of a split collar surrounding the sub-flanges along the edges of the slit of this collar respectively. Thus, a multiplicity of wedges and bars does not have to be provided.

The furthest-apart axial edges of the two bars make between them a wedging angle and, according to a preferred embodiment, for ensuring that the wedge is properly held in place on the bars, the faces that have the furthest-apart axial edges and the edges common with the collar make between them a taper angle.

The wedge may have two branches joined together by a transverse part cooperating with a stop made on the flange. In the open position, the abutting of the transverse piece on the stop prevents the wedge from being lost. In the closed position, that is to say when the wedge clamps the collar, this stop prevents the wedge from coming out inopportunely and from unclamping the collar.

The wedge may also include a handle allowing it to be easily manipulated and also forming a screen so that inopportune access to the stop is more difficult and any disassembly of the base of the wedge from the stop is made improbable.

There is another drawback of a splice protection sleeve comprising two half-shells as known from the prior art. The two half-shells are closed by two end flanges which define an opening for the passage of a cable or of several cables. At least one end flange has an outer circumferential groove in which a seal is placed, which seal may be in the form of a solid rubber seal or a seal made of an elastomer material often called a gel. The half-shell includes an inwardly projecting portion intended to penetrate the seal, in order to properly compress the seal.

The point where sealing is most difficult to ensure is the point where both the half-shells and the flange meet and where the seal is stressed in two different directions, namely in the circumferential direction and in the longitudinal direction.

According to another aspect, the invention remedies this drawback by an arrangement which improves the sealing provided by the seal.

According to this aspect of the invention, the half-shell includes, on the inner face, a cam which extends in the circumferential direction and is followed in this direction by a housing, and the flange includes a stub placed so as to push the cam back before entering the housing when the half-shell is moved closer to the flange.

During mounting, while the half-shell is being put into place from the top or from below onto the flange, both parts being made of plastic, the stub firstly pushes the cam, and therefore the half-shell, back so as to force it to deform and open up, in order for the half-shell to come onto the flange, and especially onto the elastomer or gel seal, approximately perpendicular to the latter and no longer in a direction substantially tangential thereto. It is only when the stub penetrates the housing that the half-shell suddenly resumes its position without beforehand having made the seal undergo a rolling motion. Now, it is this rolling motion in the circumferential direction which hitherto created a build-up of material at the triple point, giving rise to leakage lines, making closure more difficult and necessarily causing at other places a reduction in the amount of material of the seal, which compromised the sealing. The co-operation of the stub with the housing furthermore ensures that there is a link between the half-shell and the flange.

BRIEF DESCRIPTION OF THE DRAWINGS

In the appended drawings, given solely by way of example.

DETAILED DESCRIPTION OF THE INVENTION

Figure 1:
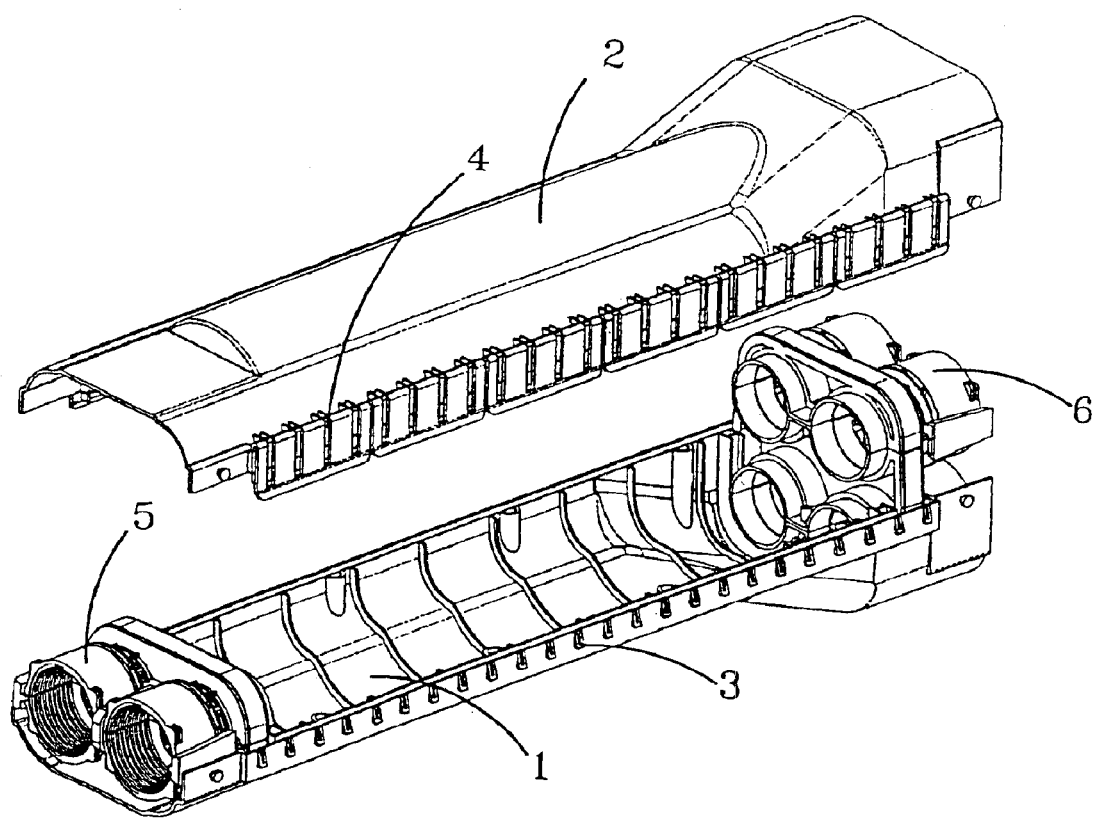
FIG. 1 is a perspective view of a sleeve according to the invention.

The splice protection sleeve shown in FIG. 1 comprises a lower half-shell 1 and an upper half-shell 2. Provided along the longitudinal free edges of the shell 1 are snap-fastening teeth 3 conjugate with snap-fastening openings 4 made along the free longitudinal edges of the half-shell 2. These snap-fastening means allow the half-shells to be assembled into a shell after two flanges 5, 6, respectively, have been interposed at the ends.

Figure 2:
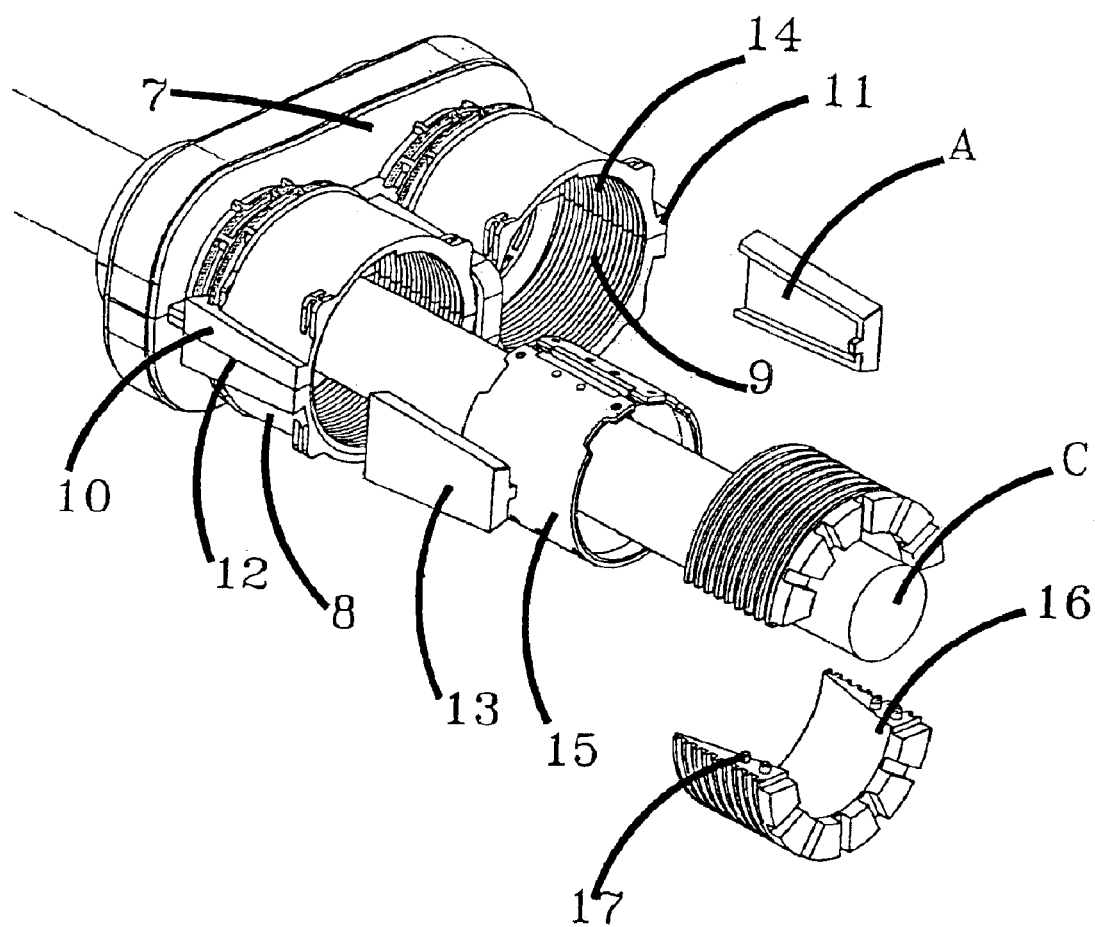
FIG. 2 is an exploded perspective view illustrating an end flange.

As shown in FIG. 2, each flange consists of two half-flanges 7, 8 which define two semicircular openings 9 and are assembled by a pair of removable assembling means consisting respectively, on the one hand, of two dovetail bars 10, 11 stemming from the two facing-edge generatrices 12 of the two half-flanges 7 and 8, and of a wedge 13 joining the two bars together and having the shape of a plate, the recess of which is conjugate with the shape of the joined-together bars. The half-flanges include a tapping 14. A longitudinally split ring 15 is interposed between the tapped portion 14 of the sub-flanges and a frustoconical threaded annulus 16 made in two parts joined together by studs 17. The annulus 16 is inserted into the opening 9 via its transverse surface of large inside diameter. The inside diameter of the small transverse surface of the annulus 16 is smaller than the outside diameter of the ring 15 when it is not deformed.

During mounting, the two half-flanges 7 and 8 are assembled by slipping the wedges 13 over the bars 10, 11 and then the split ring 15 and the annulus 16 are slipped on, by screwing the annulus 16 into the tapping 14 until the split ring 15 deforms so as to be in close contact with the outer face of the cable C which had been placed beforehand between the half-flanges 7, 8. The cable C is thus well clamped.

Figure 3:
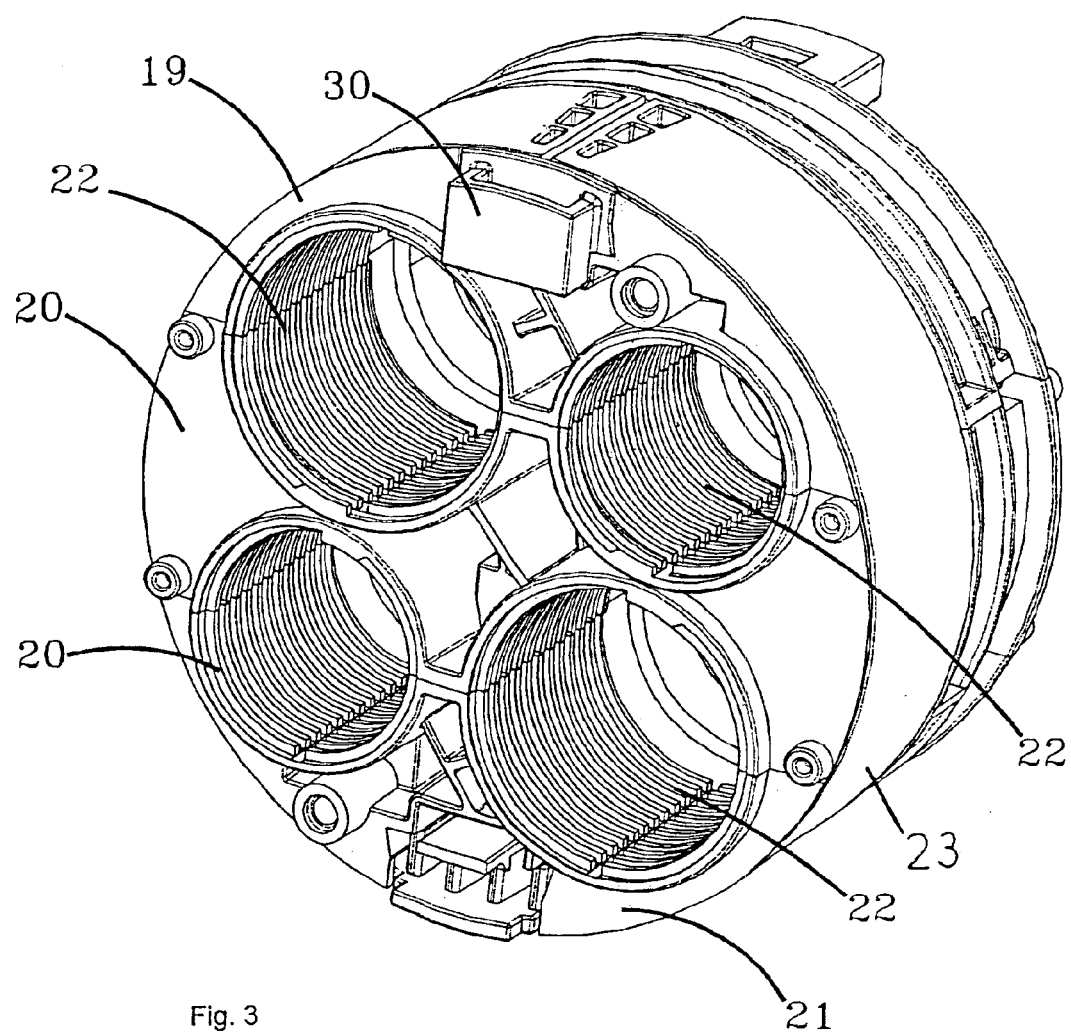
FIG. 3 is a perspective view of a mounted end flange.
Figure 4:
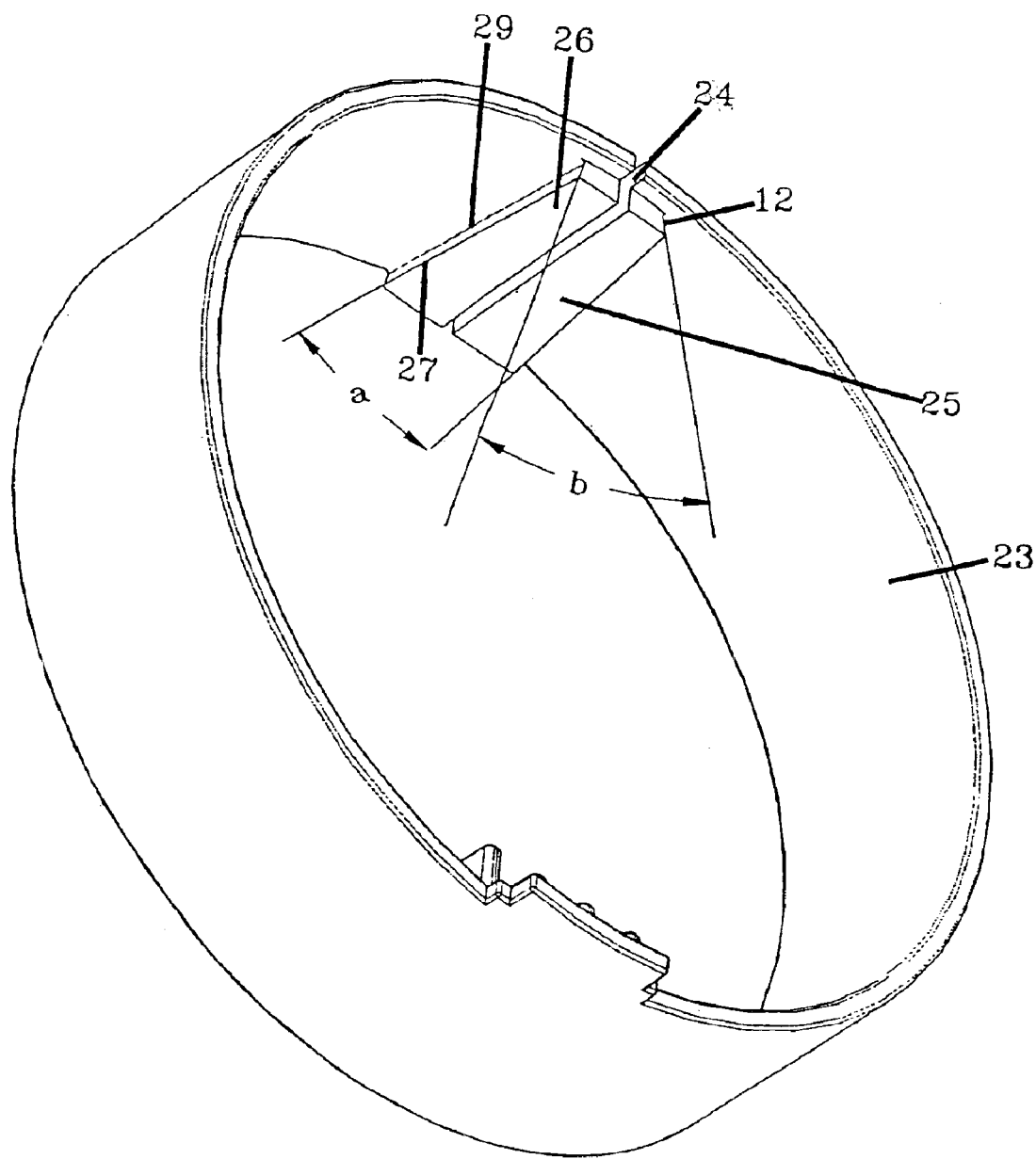
FIG. 4 is a perspective view illustrating the collar.

In FIG. 3, the flange comprises three sub-flanges 19, 20, 21 which are assembled so as to form four openings 22 for the passage of four cables. The assembling means comprise a collar 23 surrounding the outer face of the sub-flanges 19, 20, 21. This collar, which may be more clearly seen in FIG. 4, is split along a longitudinal slit 24. Along each of the edges of the slit 24, molded with the inside of the collar, is a dovetail bar 25, 26. The furthest-apart axial edges 27 of the two bars 25, 26 make a wedging angle a between them. The faces 28 that have four sides, on the one hand, these edges 27 and, on the other hand, the edges 29 common with the collar make between them a taper angle b.

Figure 5:
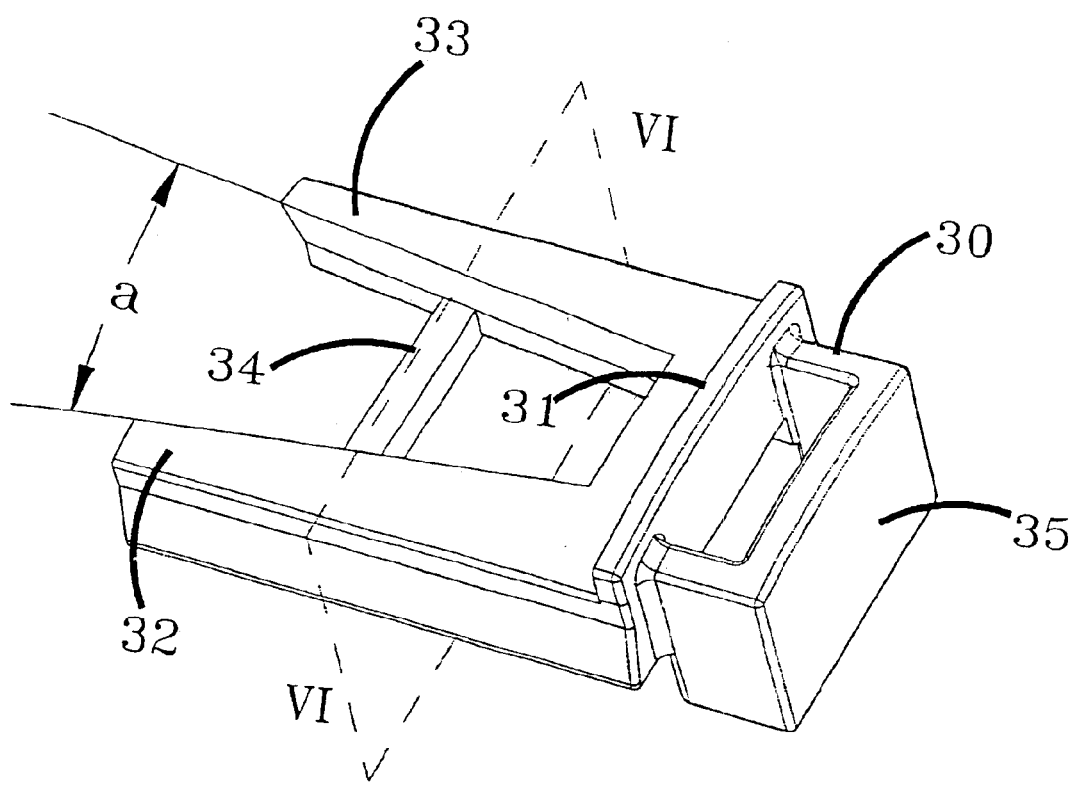
FIG. 5 is a perspective view illustrating the wedge.
Figure 6:
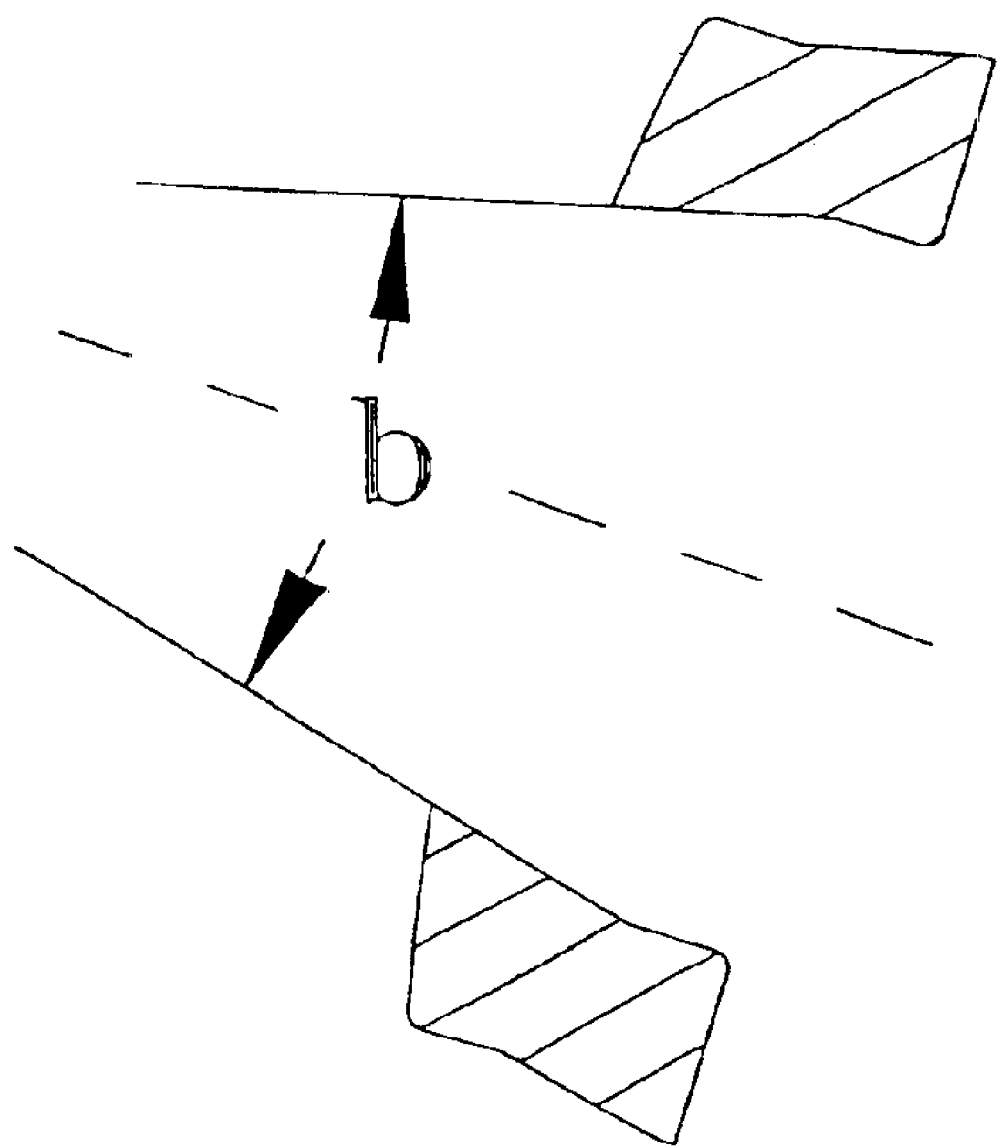
FIG. 6 is a sectional view on the line VI—VI in FIG. 5.
Figure 7:
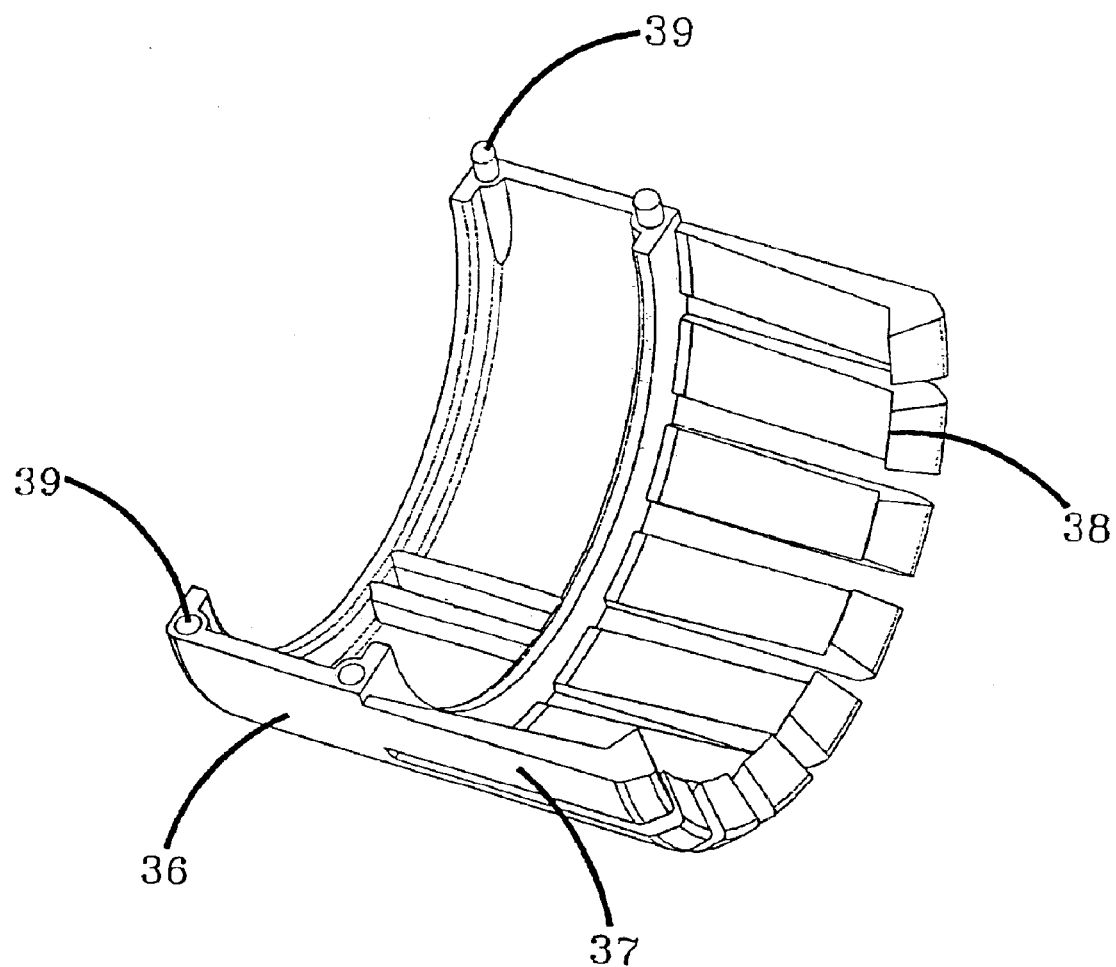
FIG. 7 is a perspective view of the ring.

The sub-flanges 19, 20 and 21 are held together by the fact that the collar 23 is held clamped against it by the cooperation of the dovetail bars 25, 26 and of a wedge which may be more clearly seen in FIG. 5 and FIG. 6.

This wedge, which, like all the other parts mentioned hitherto, is made of plastic, has a base 31 from which two branches 32, 33 stem, these branches making between them a wedging angle a. The two branches are connected via a transverse piece 34. A handle 35 is provided on the other side of the base 31. As shown in FIG. 6, the inner faces of the branches 32, 33 make between them an angle b in the plane of section VI—VI in FIG. 5.

Engaged respectively in each opening 22 of the flange is a ring 36 which includes a part 37 in the form of multiple bars terminating in inwardly directed teeth 38. The ring consists of two portions joined together by male and female parts 39. An annulus 16 is then also inserted into each opening so that the bars 37 of the ring 36 deform elastically inwards because the small side of the frustoconical annulus 16 has a smaller diameter than that of the ring when it is not deformed and so that the teeth 38 penetrate the cable C inserted into the opening. The cable is thus well clamped.

Figure 8:
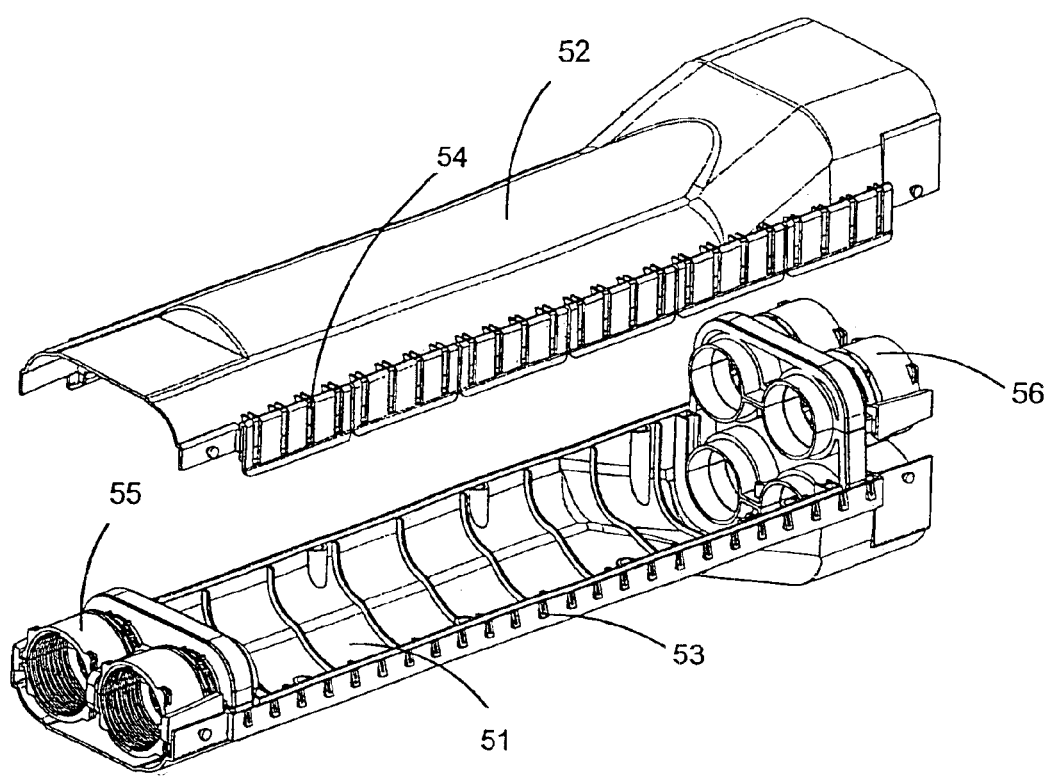
FIG. 8 is a perspective view of a protective sleeve according to the invention when the half-shells are a certain distance apart.

The splice protection sleeve shown in FIG. 8 comprises two half-shells 51 and 52 which may be closed along their longitudinal edges by closure means 53 and 54. Furthermore, the half-shells 51, 52 are closed at their transverse ends by flanges 55, 56.

Figure 9:
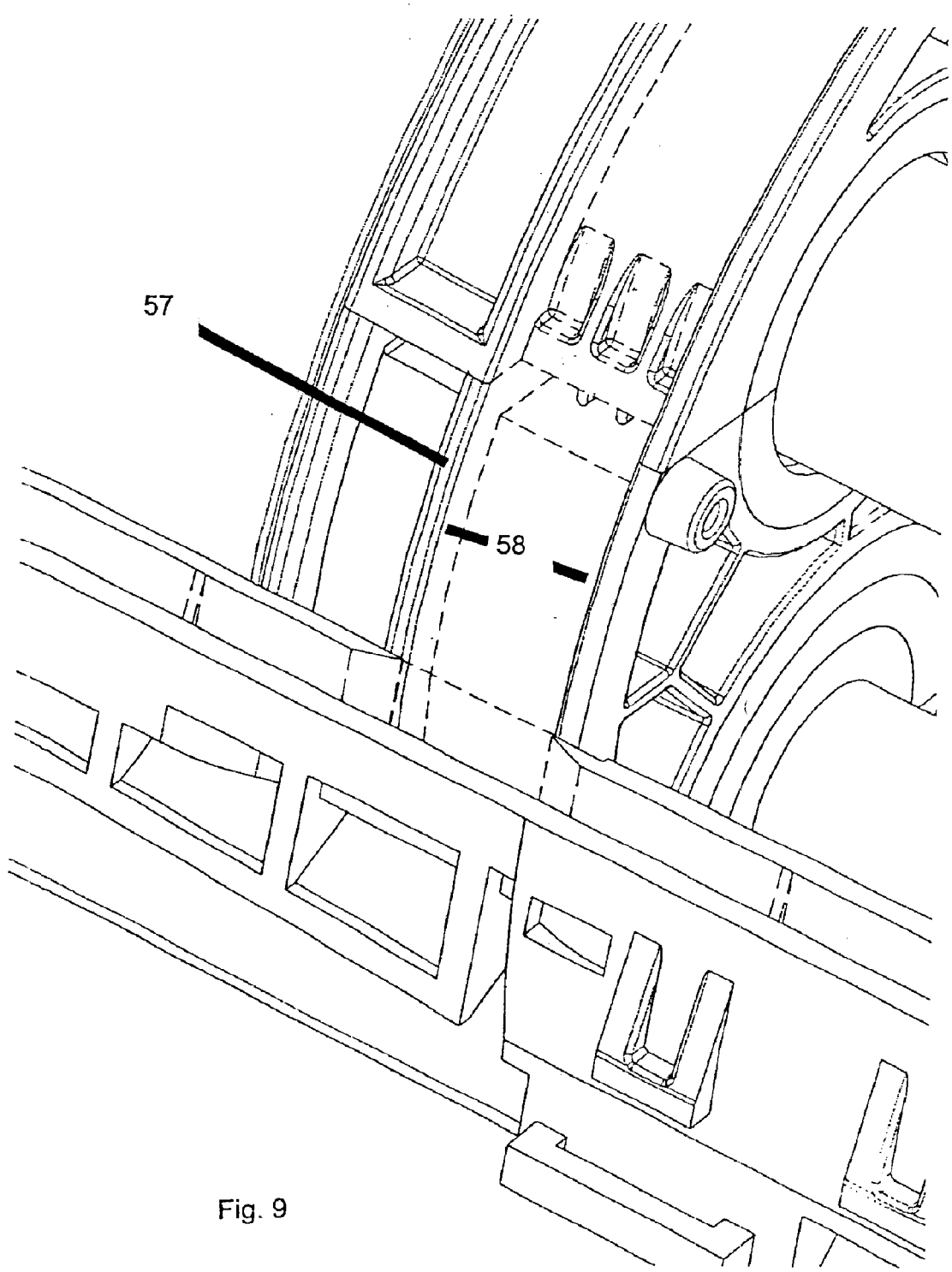
FIG. 9 is a partial perspective view of the flange used according to the invention.

In FIG. 9, the end flange has an outer circumferential groove 57 in which an elastomer seal 58 is placed.

Figure 10:
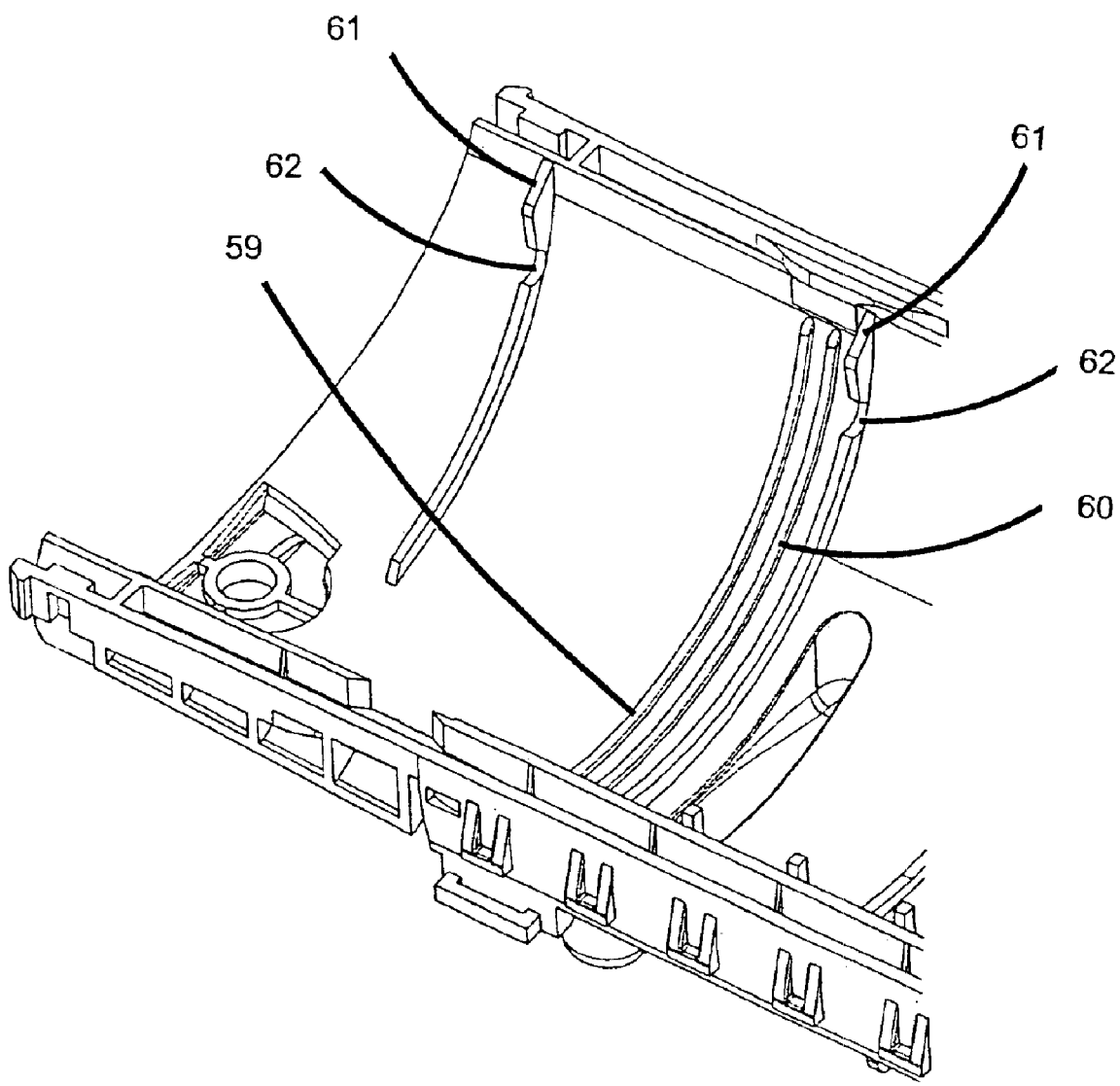
FIG. 10 is a partial perspective view of the inside of the half-shell used according to the invention.

In FIG. 10, the half-shell has two inwardly projecting ribs 59, 60 intended to penetrate the seal 58 when the protective sleeve is fully mounted. On the inner face, the half-shell has respectively two cams 61 which extend in the circumferential direction and which are followed in this direction by housings 62.

Figure 11:
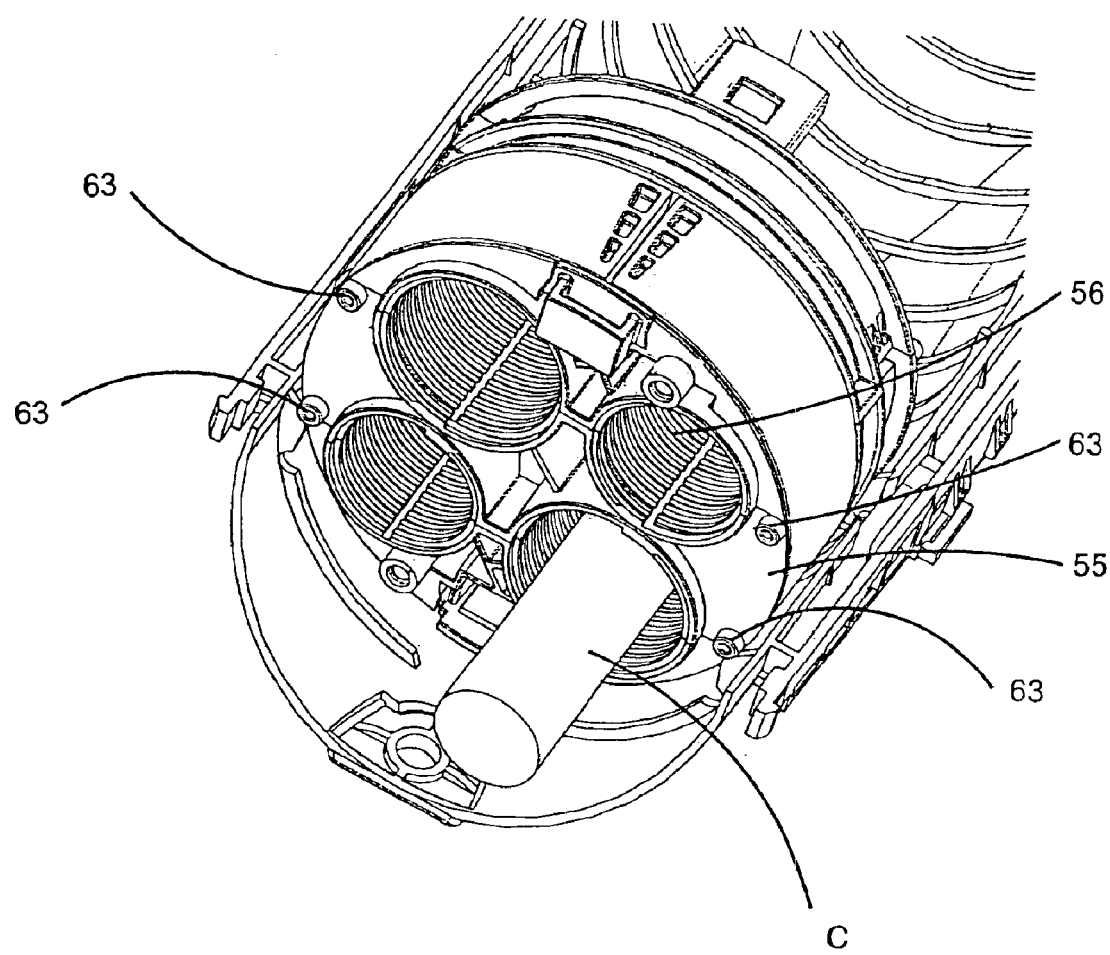
FIG. 11 is a perspective view of the sleeve of FIG. 8 when the cams are co-operating with the stubs.

In FIG. 11, the flange has a stub 63 intended to push the cam 61 back before entering the housing 62.

During mounting, the half-shell is moved towards the flange. Initially, the cams 61 and the stubs 63 come respectively into contact so that the half-shell 52 deforms and opens up. It is only when the stubs 63 reach the housings 62 and enter therein that the half-shell 52 resumes its initial position and that the ribs 59, 60 come into contact with the seal 58 and penetrate it. During mounting, the seal 58 is thus hardly stressed in a direction other than normal to its surface.

The cams 61 are placed on each side of the ribs 60 at a longitudinal distance approximately equal or slightly greater than the thickness of a flange.

Each cam 61 is close to the longitudinal edge of the half-shell 52. The same applies to the other longitudinal edge of the half-shell 52. There are therefore in total eight cams per half-shell, four among them corresponding to four stubs made on the same flange. Two stubs are on one face of the flange and two others on the opposite face. The same applies to the second flange.

What is claimed is:

1. Splice protection sleeve having a flange consisting of at least two sub-flanges assembled by removable assembling means so as to leave a circular opening for passage of a cable, wherein:

the assembling means include two dovetail bars and a wedge joining the two bars together;

the sub-flanges have a tapped portion; and a deformable ring is interposed between the tapped portion and an at least partly frustoconical two-part threaded annulus, the annulus, whose inside diameter of the small transverse surface is smaller than the outside diameter of the undeformed ring, being screwed into the tapped portion of the opening, by being inserted thereinto via its transverse surface of large inside diameter.

2. Sleeve according to claim 1, wherein the two dovetail bars stem from the two facing-edge generatrices of the two half-flanges.

3. Sleeve according to claim 1, wherein the two dovetail bars are provided on the inner face of a split collar surrounding the sub-flanges along the edges of the slit of the collar.

4. Sleeve according to claim 3, wherein the furthest-apart axial edges of the two dovetail bars make between them a wedging angle (a) and the faces that have sides comprising the axial edges and the edges common with the collar make between them a taper angle (b).

5. Sleeve according to claim 1, wherein the ring is split longitudinally.

6. Splice protection sleeve comprising two half-shells closed by two end flanges, at least one end flange having an outer circumferential groove in which a seal is placed and one half-shell having an inwardly projecting portion intended to penetrate the seal, the half-shell comprising, on the inner face, a cam which extends in the circumferential direction and is followed in this direction by a housing and the flange includes a stub placed so as to push the cam back before entering the housing when the half-shell is moved closer to the flange.

7. Sleeve according to claim 6, wherein the cam is close to the longitudinal edge of the half-shell.

8. Sleeve according to claim 7, further comprising a cam close to each longitudinal edge of the half-shell.

9. Sleeve according to claim 8, further comprising two cams close to each longitudinal edge of the half-shell.

10. Sleeve according to claim 9, further comprising four stubs for each flange.

* * * * *